Feb. 12, 1924.
T. J. CARTER
1,483,842
ARTIFICIAL CASTING BAIT
Filed April 3, 1919
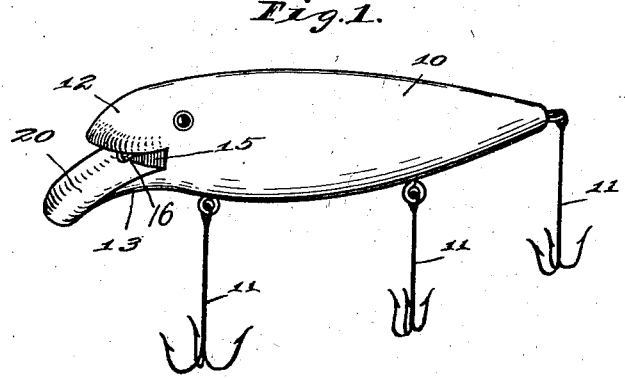
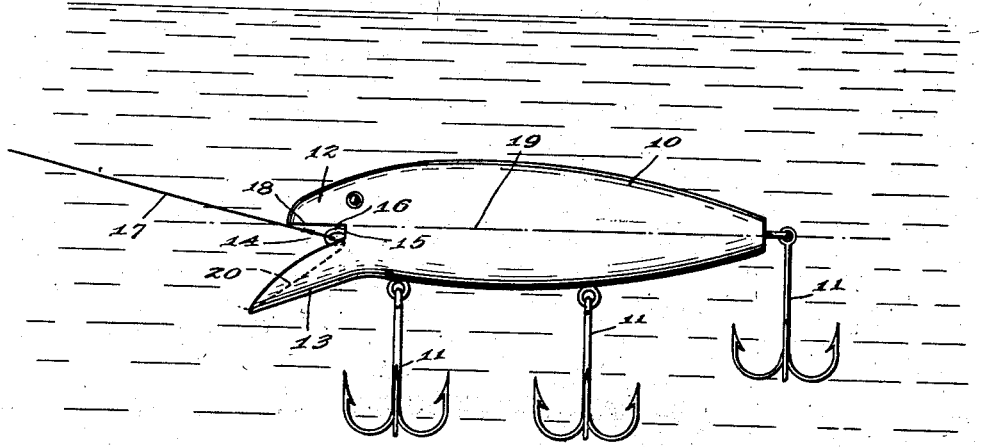
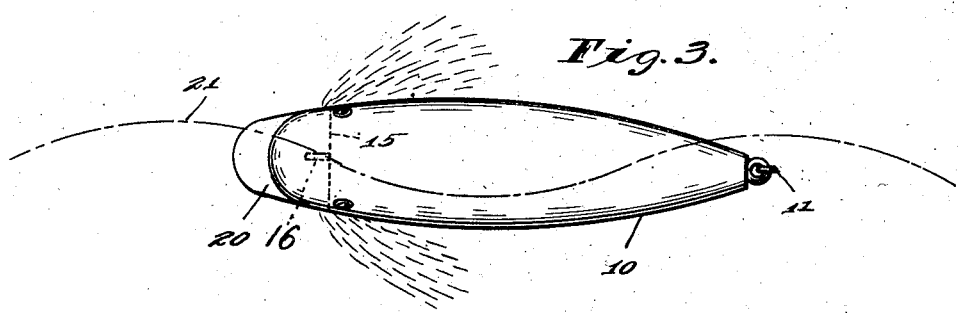
Witness
Frank A. Fahle
Inventor
Thomas J. Carter,
By
Attorneys Patented Feb. 12, 1924.

1,483,842

UNITED STATES PATENT OFFICE.

THOMAS J. CARTER, OF INDIANAPOLIS, INDIANA, ASSIGNOR TO CARTER'S BESTEVER BAIT COMPANY, OF INDIANAPOLIS, INDIANA, A CORPORATION OF INDIANA.

ARTIFICIAL CASTING BAIT.

Application filed April 3, 1919. Serial No. 287,207.

*To all whom it may concern:*

Be it known that I, THOMAS J. CARTER, a citizen of the United States, residing at Indianapolis, in the county of Marion and State of Indiana, have invented a new and useful Artificial Casting Bait, of which the following is a specification.

It is the object of my invention to provide an artificial casting bait which when drawn through the water will travel below the surface of the water in a substantially level position and with a wiggling movement closely resembling that of a real minnow; and to obtain this action by controlling surfaces which may be formed on a single piece of wood from which the whole bait is made.

In obtaining this result, I provide a bait which in its preferred form has a general cigar-shaped neckless body provided with a head in which there is an open mouth having upper and lower jaws the rear ends of which are joined by an upright wall; the lower jaw protrudes forward and downward beyond the upper jaw and may have its upper surface transversely concave, while the under surface of the upper jaw is preferably plane and lies substantially on the axis of the bait. The lower jaw makes the bait travel below the surface of the water; the upper surface of the lower jaw gives the wiggling movement of the bait as it is drawn through the water; the upper jaw holds the bait substantially level; and the rear wall of the mouth gives a slight water resistance, though not one noticeable to the fisherman or sufficient to bend unduly the lightest rod, and also produces a lateral deflection of the water and materially assists in giving the bait the wiggling movement which is produced as the bait is drawn through the water.

The accompanying drawing illustrates my invention: Fig. 1 is a perspective view of a bait constructed in accordance with my invention; Fig. 2 is a side elevation of such bait, in the water; and Fig. 3 is a plan of such bait, and indicates the line of travel of the head and the lateral deflection of the water from the open mouth.

The bait is conveniently made of a single piece of wood, with a cigar-shaped body 10 to which are attached in any suitable manner at the bottom and at the tail a series of hooks 11. This body 10 is in general cigar-shaped. At the front end of the body 10, and without a contraction or neck between, there is a head portion having an upper jaw 12 and a lower jaw 13, which are spaced apart, separated at the sides to form an open mouth 14. The rear of the mouth 14 is formed by a substantially vertical wall 15 which connects the adjacent surfaces of the jaws 12 and 13; and in this rear wall 15 is a screw-eye 16 for the attachment of the line 17.

The upper jaw 12 has a substantially plane under surface 18, which is substantially horizontal when the bait is in use and which lies on the axis 19 of the bait. The lower jaw 13 protrudes forward beyond the front end of the upper jaw 12, and also projects obliquely downward so that both its upper and lower surfaces are inclined downward toward the front and converge to meet substantially at the front edge of the jaw. The upper surface 20 of the lower jaw 13 is shown as concave transversely, to give ample room for inserting the screw-eye 16, as is clear from Figs. 1 and 2, as well as being inclined downward and forward. These surfaces of the open mouth are formed on a single piece of wood from which the bait is constructed; though, if desired, the bait may be constructed of other materials than wood, as for instance by being made as a hollow metal structure.

In operation, the bait is cast in the usual manner, and after it has struck the water is pulled in by the reeling up of the line 17. Although the bait is lighter than water, so that it floats when at rest, it travels below the surface of the water in a substantially level position as it is reeled in, as indicated in Fig. 2; and wiggles about a vertical axis within itself as it travels, as indicated in Fig. 3, so that its movement closely resembles that of a live minnow. This is due to the head construction with the open mouth. As the bait is drawn through the water, the action of the water on the lower jaw pulls the bait down below the surface. This action is due to both the lower and upper surfaces; for the forwardly and downwardly inclined upward surface 20 acts with an inclined plane action to force the bait downward, and the forwardly and downwardly inclined under surface of the lower jaw 13 creates a slight suction behind the lower jaw, thus also tending to pull the bait downward. The action of the water against this under surface 18 of the upper jaw 12, however, resists this downward movement and creates a force component which by its upward action on the head forces the tail downward to maintain the bait substantially in a level position. This level position is thus largely due to the open mouth, though the upward component of the pull of the line 17 also assists in holding the bait level.

The rear wall 15 of the mouth acts as a slight water resistance, though not sufficient to bend unduly the lightest rod or to be noticeable to the fisherman in reeling in, and produces a lateral deflection of the water, as is shown in Fig. 3; this lateral water movement seems to increase the minnow-like appearance of the movement of the bait. The rear wall 15 also assists in maintaining the bait level, since it receives the impact of the water caught in the open mouth and deflected upward by the surface 20. The upper surface 20 of the lower jaw 13, probably assisted by the rear wall 15 of the open mouth, probably gives the bait the transverse wiggle, so that its head will travel along a laterally sinuous path 21 (Fig. 3); this transverse wiggling movement of the bait is about a vertical axis within the bait body, so that the tail of the bait in its transverse movements is at most times moving oppositely to the head, but the body seems actually to bend, and so produces a total movement deceptively similar to the wiggle of a live minnow as it travels through the water, instead of being a series of relatively long darts alternately to opposite sides of the general direction of movement as is the case with many casting baits.

I claim as my invention:

1. An artificial casting bait, comprising a body portion having a head formed with spaced upper and lower jaws which are separated at the sides and the adjacent surfaces of which are connected at the rear by a substantial upright wall, said lower jaw protruding forward beyond the upper jaw and being inclined forward and downward.

2. An artificial casting bait, comprising a body portion having a head formed with spaced upper and lower jaws separated at the sides, said lower jaw protruding forward beyond the upper jaw and being inclined forward and downward.

3. An artificial casting bait, comprising a body portion having a head formed with spaced upper and lower jaws, separated at the sides, both the upper and lower surfaces of the lower jaw being inclined forward and downward and the lower jaw protruding forward beyond the upper jaw.

4. An artificial casting bait, comprising a body portion having a head formed with spaced upper and lower jaws separated at the sides, the upper surface of the lower jaw being inclined forward and downward and being transversely concave and the lower jaw protruding forward beyond the upper jaw.

5. An artificial casting bait, comprising a body portion having a head formed with spaced upper and lower jaws separated at the sides, the under surface of the upper jaw being substantially plane and horizontal and the lower jaw protruding forward beyond the upper jaw and having its upper surface inclined forward and downward.

6. An artificial casting bait, comprising a body portion having a head formed with spaced upper and lower jaws separated at the sides, said lower jaw protruding forward beyond the upper jaw and having a forwardly and downwardly inclined upper surface, said upper jaw having a substantially horizontal under surface, and the adjacent surfaces of the two jaws being joined by a substantially upright wall at their rear ends.

In witness whereof, I have hereunto set my hand at Indianapolis, Indiana, this first day of April, A. D. one thousand nine hundred and nineteen.

THOMAS J. CARTER.